United States Patent [19]

Daniels et al.

[11] Patent Number: 4,763,360
[45] Date of Patent: Aug. 9, 1988

[54] PASSENGER ENTERTAINMENT SYSTEM HAVING DIRECT COUPLED SEAT RECEIVERS

[75] Inventors: James W. Daniels, Kent; Carl W. Erickson, Maple Valley, both of Wash.

[73] Assignee: The Boeing Company, Seattle, Wash.

[21] Appl. No.: 908,449

[22] Filed: Sep. 17, 1986

[51] Int. Cl.⁴ .............................................. H04B 5/00
[52] U.S. Cl. ........................................ 455/3; 455/57; 340/310 R; 381/77
[58] Field of Search ............................ 455/3, 41, 57; 340/310 R, 310 A; 379/55; 381/77–79; 333/24 R

[56] References Cited

U.S. PATENT DOCUMENTS

| | | | |
|---|---|---|---|
| 3,553,675 | 1/1971 | Shower et al. | 455/3 |
| 4,352,200 | 9/1982 | Oxman | 455/41 |
| 4,428,078 | 1/1984 | Kuo | 455/3 |

Primary Examiner—Michael A. Masinick
Attorney, Agent, or Firm—Conrad O. Gardner; B. A. Donahue

[57] ABSTRACT

A passenger entertainment system having direct coupled individual seat receivers. Direct coupling of receivers to the passenger entertainment power and intelligence information signals is provided through a seat track transmission line consisting of one or more conductors associated with the seat track and running parallel to the seat track.

3 Claims, 3 Drawing Sheets

PASSENGER ENTERTAINMENT SYSTEM HAVING DIRECT COUPLED SEAT RECEIVERS

BACKGROUND OF THE INVENTION

The present invention relates to passenger entertainment systems in commercial aircraft and more particularly to a means and method of coupling the individual seat receivers to the passenger entertainment system transmitter.

DESCRIPTION OF THE PRIOR ART

The patent literature is replete with various types of power distribution systems having current-carrying bars, electrical traps for supplying currents and other current-carrying transmission arrangements. The patent art more specifically is exemplified by U.S. Pat. No. 3,603,918 which shows an electric power distribution system having a current-carrying bar; U.S. Pat. No. 4,032,208 showing a connector for track lighting systems; and U.S. Pat. No. 4,083,439 showing a power collection device for electric powered rail cars. An earlier U.S. Pat. No. 4,428,078 assigned to The Boeing Company shows transmission of power and multiplex data from a parallel transmission line on the aircraft floor to an air-core multi-turn loop located in the seat leg framework on the seat module. This configuration is unable to provide the power transfer capabilities which the present direct coupled system provides.

Typical commercial airplane entertainment and service systems are hard wired required cable and connector interconnection to the seat modules. A typical installation requires the installation of permanent wire bundles in aircraft structure routed to convenient locations along the fuselage or beneath the floor. The nearest seat module, in a group of seat modules, is connected to the permanent wiring and then all remaining seat modules are linked, in a daisy-chain fashion, from one another in succession. Interconnecting cables are then required to be protected and concealed in a trough running parallel to the seat tracks. Such systems are deficient in the sense that any radical change in seat configuration would require the fabrication of new interconnect cables of the proper length to match the new seat spacing dimensions. Seat removal or configuration changes require a labor intensive effort including revision of connect cables, their interconnection, and their protection and removal from the aforementioned trough.

SUMMARY OF THE INVENTION

Preferred embodiments of the present invention provide direct coupling of individual seat receivers through an electrical conductor or plurality of conductors disposed within the seat track which conductors are connected to the passenger entertainment system. A conductive probe in the seat leg can make direct connection to a conductive plate extending along the seat track in accordance with a first embodiment, or a plurality of seat conductors may be disposed parallel with and along the length of the seat track itself in accordance with a further embodiment of the invention. The direct connection between seat receiver and the conductive transmission line or lines disposed along the length of the seat track may be made by actuation of a seat latch if desired.

A signal box so installed in the seat track provides direct coupling to seat receivers disposed at various positions along the length of the track without need for a hard wired connection thereby eliminating the problems existent in prior entertainment and service systems which required interconnection of seat receivers on an individual basis.

DESCRIPTION OF THE THE PREFERRED EMBODIMENTS

Figure 1:
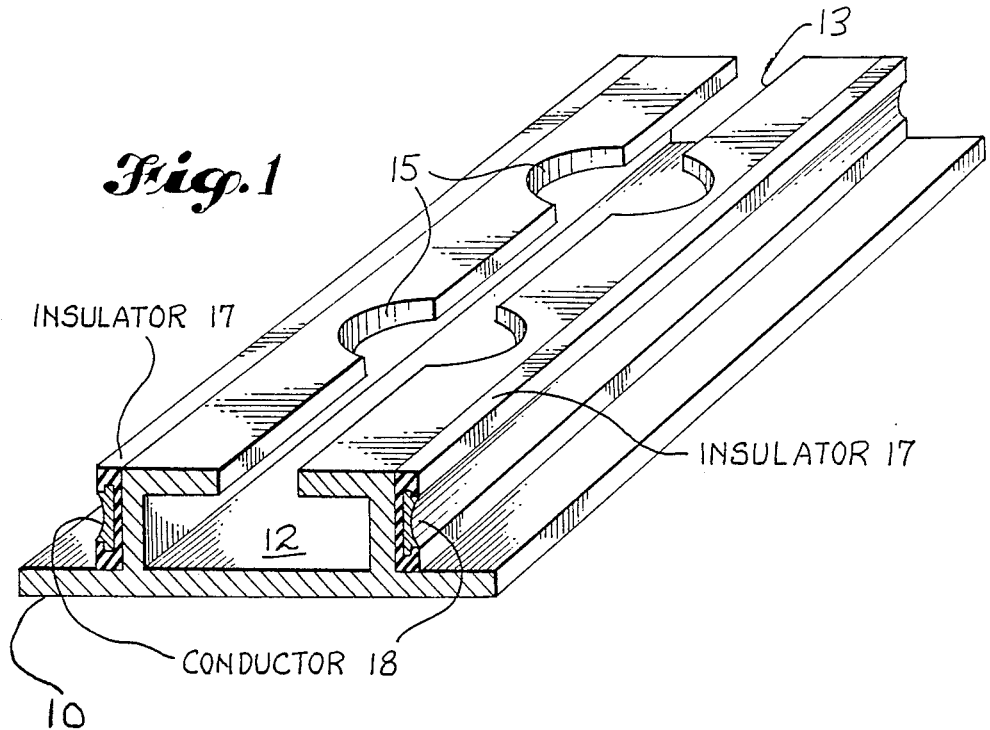
FIG. 1 is an isometric view in partial section illustrative of a first embodiment of the invention showing a seat track having parallel extending conductors.
Figure 2:
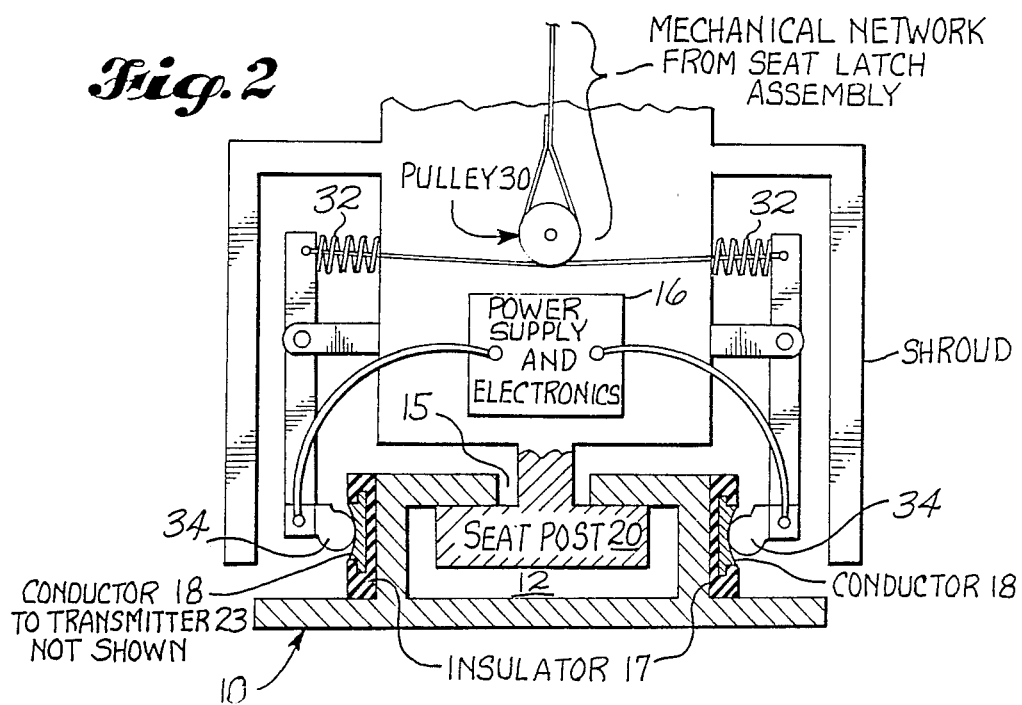
FIG. 2 is illustrative of the pincer like spring-loaded mechanism for interconnecting the individual seat receiver with the track embodiment of FIG. 1.
Figure 3:
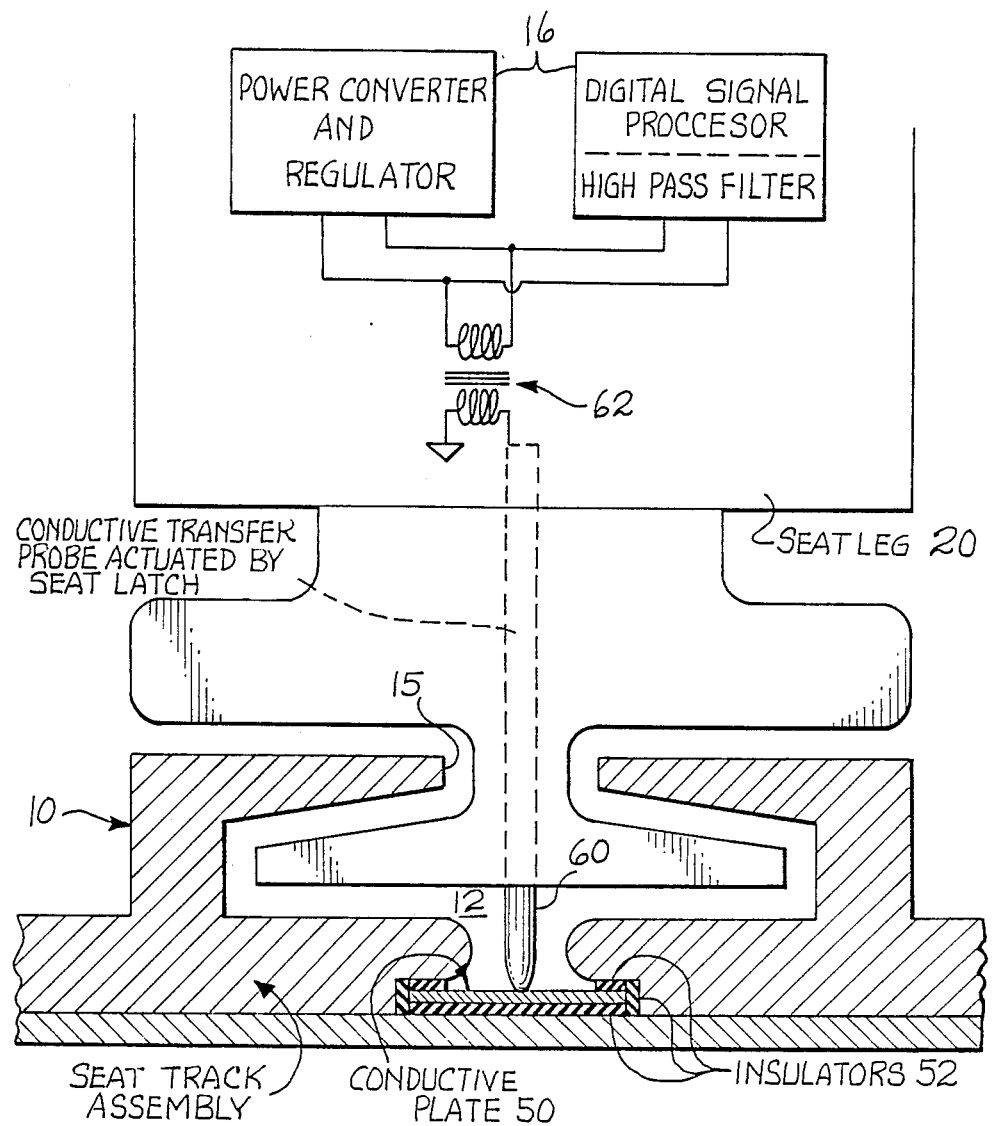
FIG. 3 is a vertical sectional view of a further embodiment of seat track utilized in the present direct coupling of seat receivers and further illustrative of probe contact to an individual receiver seat track station.
Figure 4:
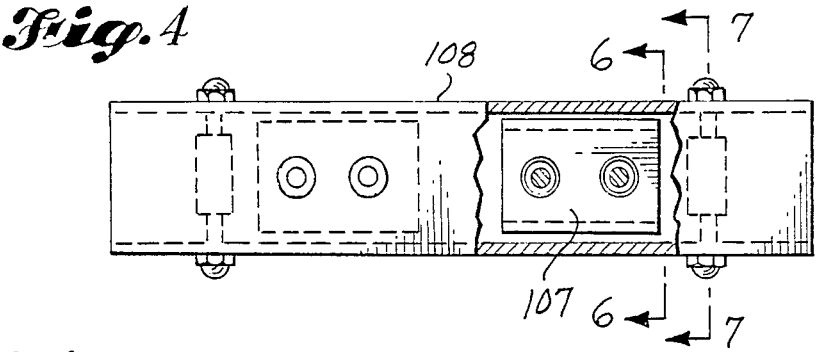
FIG. 4 is a top plan view of another embodiment of direct coupled seat track receiver comprising a retrofit seat track assembly in accordance with the present invention.
Figure 5:
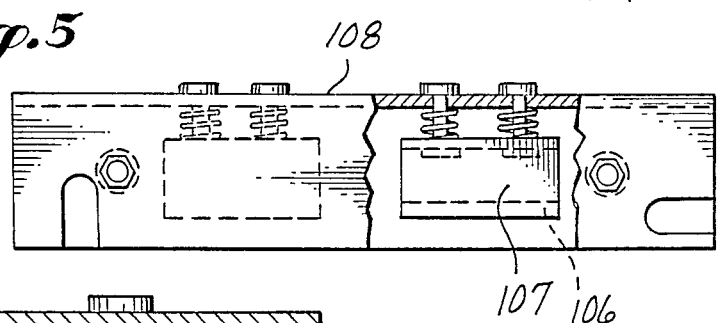
FIG. 5 is a side view of the embodiment of FIG. 4.
Figure 6:
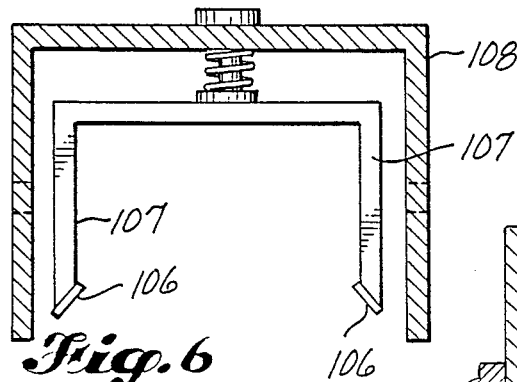
FIG. 6 is a sectional view taken along the line 6—6 of FIG. 4.
Figure 7:
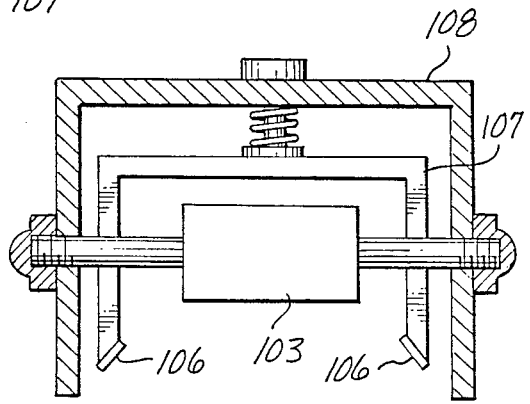
FIG. 7 is a sectional view of the embodiment of FIG. 4 taken along the lines 7—7 of FIG. 4; and, FIG. 8 is a sectional view of an assembly of FIG. 4 showing seat track coupling in detail.

Turning now to FIG. 1 and a first embodiment of the present direct coupling of passenger entertainment systems to individual seat receivers, it will be observed that a seat track indicated generally at 10 consists of a generally rectangular shaped chamber 12 having a top flap 13 with individual apertures 15 for insertion of seat legs (not shown). Insulator strips 17 run parallel with and in contact with the outer sidewalls of rectangular shaped chamber 12. Insulator strips 17 support the parallel extending conductor members 18. As seen in the vertical sectional view of FIG. 2 a seat post 20 is inserted through aperture 15 into track 10 with the outer surfaces of conductor strips 18 available for a direct coupling by conductive contact to the power supply and electronics of the individual seat receivers 16. A seat receiver 16 may be of the type shown under numeral 16 of U.S. Pat. No. 4,428,078. Further a transmitter 23 of the type shown in U.S. Pat. No. 4,428,078 provides the passenger entertainment signals to the conductive transmission line formed by conductors 18 of FIG. 2. In FIG. 2 a pulley 30 is shown to make and break the conductive coupling connections at 34 through energization and deenergization of spring means 32. In the illustrated embodiment of FIG. 2 the seat latch assembly can therefore through pulley 32 make the automatic connection and although a line and pulley is utilized in the embodiment of FIG. 2 other equivalent mechanical means may be utilized between the seat latch assembly (not shown) and the electrical contacts 34 which are made and broken depending upon the connection and disconnection condition of the seat latch. While a pincer like, spring-loaded contactor mechanism is shown to provide the direct coupling in FIG. 2, an actual probe makes the direct contact in the embodiment of FIG. 3 with a conductive plate 50 which is in the form of a strip extending parallel with and along the bottom of the seat track 10. Probe 60 which as in the embodiment of FIG. 2 may be also energized by actuation of the seat latch to make the contact with conductive plate 50 makes and breaks the direct coupling dependent upon the status of the seat latch. It can also be seen that in the embodiment of FIG. 3 the conductive plate 50 extending along the bottom of the seat track is required to be insulated on bottom and sides by insulators 52 running along the sides of and underneath the conductive plate member 50. Above conductor probe 60 from which it protrudes, is seat leg 20 which may have the receiver electronics 16 which receiver electronics 16 may be coupled by suitable coupling means shown generally at 62 to the probe 60. The aforementioned embodiments of direct coupled passenger entertainment systems to the individual seat receivers eliminates the previous problem of power transfer through inductive coupling between transmission lines in the seat tracks and provides individual direct connections to the seat receivers 16 at the time the seats are installed.

Figure 8:
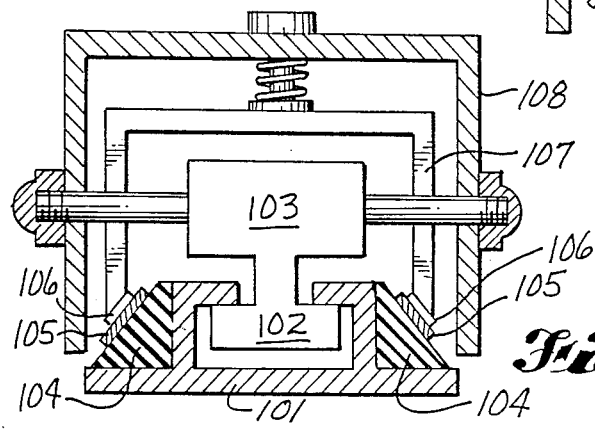

Turning now to the complete seat track assembly showing the direct conductive contact in FIG. 8 with side and sectional views thereof in FIGS. 4–7, there can be seen a seat post 102 and seat frame 103 installed. A layer of insulating material 104 is mounted in seat track 101. Direct coupling conductors 105 are supported by layer of insulating material 104, the angled side portion providing self aligning capability with the individual seat group associated conductor 106 and associated holding bracket 107 which is in turn spring mounted in nonconductive housing member 108. Each nonconductive housing member 108 includes more than one seat group associated conductor 106 and associated holding bracket 107 thereby providing reliable direct electrical contact. It can be seen that seat group associated conductor 106, spring loaded holding bracket 107 and nonconductive housing member 108 comprises a single assembly which can easily be mounted (or removed from) a seat frame thereby providing easy retrofit capability using any standard aircraft seat.

What is claimed is:

1. An audio passenger entertainment system for transmission of receiver power and intelligence information to a plurality of receiver means associated with a respective plurality of seat units distributed along a seat track comprising in combination:
   an electrically conductive transmission line extending along the length of said seat track and parallel therewith, said electrically conductive transmission line including an electrical insulator strip disposed between an electrically conductive strip and said seat track; and,
   electrical connector means disposed between each of said plurality of receiver means associated with each of a corresponding plurality of seat units distributed along said seat track and said seat track for making direct coupling by conductive contact therebetween.

2. The invention according to claim 1 wherein said electrical connector means comprises a conductive transfer probe actuated by a seat latch.

3. The invention according to claim 1 wherein said electrical connector means comprises a pincer like spring-loaded mechanism.

* * * * *